(12) United States Patent
Iwasawa

(10) Patent No.: US 8,111,467 B2
(45) Date of Patent: Feb. 7, 2012

(54) COMPACT ZOOM LENS

(75) Inventor: Yoshito Iwasawa, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/046,927

(22) Filed: Mar. 14, 2011

(65) Prior Publication Data

US 2011/0222166 A1 Sep. 15, 2011

(30) Foreign Application Priority Data

Mar. 12, 2010 (KR) ......................... 10-2010-0022435

(51) Int. Cl.
*G02B 15/14* (2006.01)
(52) U.S. Cl. ........ 359/690; 359/683; 359/684; 359/685; 359/686; 359/687; 359/713; 359/714; 359/715; 359/716; 359/726; 359/740; 359/785
(58) Field of Classification Search .......... 359/683–687, 359/690, 713–716, 726, 740, 785
See application file for complete search history.

(56) References Cited

U.S. PATENT DOCUMENTS

2009/0208195 A1 * 8/2009 Hatakeyama ................. 359/684

FOREIGN PATENT DOCUMENTS

| JP | 08-248318 A | 9/1996 |
| JP | 2004-184627 A | 7/2004 |

* cited by examiner

*Primary Examiner* — Evelyn A. Lester
(74) *Attorney, Agent, or Firm* — Drinker Biddle & Reath LLP

(57) ABSTRACT

A zoom lens includes, in order from an object side to an image plane side, a first lens group fixed to the image plane during zooming, having a positive refractive power, and including a single lens having a negative refractive power, an optical path change member for changing an optical path, and a positive lens group having a positive refractive power, which are arranged in order from the object side, a second lens group having a negative refractive power and including a negative lens group and a positive lens group which are arranged in order from the object side with an air gap, a third lens group fixed to the image plane during zooming and having a positive refractive power, and at least one lens group having a positive refractive power. The zoom lens satisfies the conditions the $1.4<|fLG1/fw|<5.8$ and $-4.8<Ept/Yimg<-2.5$.

16 Claims, 16 Drawing Sheets

COMPACT ZOOM LENS

CROSS-REFERENCE TO RELATED PATENT APPLICATIONS

This application claims the benefit of Korean Patent Application No. 10-2010-0022435, filed on Mar. 12, 2010, in the Korean Intellectual Property Office, the disclosure of which is incorporated herein in its entirety by reference.

BACKGROUND

The invention relates to a compact zoom lens having a bending-type optical system.

Recently, image forming optical devices such as digital still cameras or digital camcorders using solid state image sensors, for example, charge coupled devices (CCD) or complementary metal-oxide semiconductors (CMOS) for converting an optical image into an electric signal are widely and rapidly used. Also, as portability is regarded as important, a demand for increased miniaturization of the device is present. As one of designs for decreasing the thickness of a camera, a zoom lens having a structure of refracting an optical path within an optical system so that the thickness of a camera is not influenced by the number of lens units is employed.

The bending-type optical system is implemented, for example, by using a prism that can change an optical path by 90°. The thickness of a camera is determined by the overall thickness of lenses, which are at an object side of the prism, and an effective diameter of a lens group arranged at an image side of the prism. In achieving the miniaturization of the device by reducing the thickness and the diameter, a design which may facilitate prevention of the excessive overall length of the optical system and correction of aberration as well, by appropriately setting the number of lenses arranged from the prism to the image side, is needed.

SUMMARY

To solve the above and/or other problems, various embodiments of the invention provide a compact zoom lens having a superior optical performance.

According to an embodiment of the invention, a zoom lens comprises, in order from an object side to an image plane side, a first lens group fixed to the image plane during zooming, having a positive refractive power, and including a single lens having a negative refractive power, an optical path change member for changing an optical path, and a positive lens group having a positive refractive power, which are arranged in order from the object side; a second lens group having a negative refractive power and including a negative lens group and a positive lens group which are arranged in order from the object side with an air gap; a third lens group fixed to the image plane during zooming and having a positive refractive power; and at least one lens group having a positive refractive power, wherein a lens group arranged closest to the image plane comprises a positive lens group and a negative lens group which are arranged in order from the object side with an air gap, and the zoom lens satisfies the following conditions:

$$1.4 < |fLG1/fw| < 5.8 \text{ and}$$

$$-4.8 < Ept/Yimg < -2.5,$$

wherein "fLG1" is a focal length of a lens arranged closer to the object side than the optical path change member in the first lens group, "fw" is the focal length of the overall zoom lens at a wide angle position, "Ept" is the position of an exit pupil at a telephoto position, and "Yimg" is the maximum image height on the image plane.

The focal length f2 of the second lens group may satisfy a condition that $0.6 < |f2/fw| < 1.60$.

The third lens group may include a lens in which at least one surface is aspherical. The aspherical surface may have a shape in which a positive refractive power decreases closer to a paraxial.

A positive lens group included in the lens group arranged closest to the image plane may include a lens in which at least one surface is aspherical.

The zoom lens may satisfy a condition that $0.3 < |fLm/fLp| < 1.53$, wherein "fLm" is the focal length of a negative lens group included in the lens group arranged closest to the image plane side, and "fLp" is the focal length of a positive lens group included in the lens group arranged closest to the image plane side.

The zoom lens may satisfy a condition that $0.8 < |fLm/fw| < 2.15$, wherein "fLm" is the focal length of a negative lens group included in the lens group arranged closest to the image plane side.

According to another embodiment of the invention, a zoom lens comprises, in order from an object side to an image plane side, a first lens group fixed to the image plane during zooming, having a positive refractive power, and including a negative lens group having a negative refractive power, an optical path change member for changing an optical path, and a positive lens group having a positive refractive power, which are arranged in order from the object side; a second lens group having a negative refractive power and including a negative lens group having a negative refractive power and a positive lens group having a positive refractive power which are arranged in order from the object side with an air gap; a third lens group fixed to the image plane during zooming and having a positive refractive power; and at least one lens group having a positive refractive power, wherein a lens group arranged closest to the image plane comprises a positive lens group having a positive refractive power and at least one aspherical surface, and a negative lens group having a negative refractive power, which are arranged in order from the object side with an air gap, and the zoom lens satisfies the following conditions:

$$1.4 < |fLG1/fw| < 5.8;$$

$$-4.8 < Ept/Yimg < -2.5; \text{ and}$$

$$0.3 < |fLm/fLp| < 1.53,$$

wherein "fLG1" is the total focal length of a lens group arranged closer to the object side than the optical path change member in the first lens group, "fw" is the focal length of the overall zoom lens at a wide angle position, "Ept" is the position of an exit pupil at a telephoto position, "Yimg" is the maximum image height on the image plane, "fLm" is the focal length of a negative lens group included in the lens group arranged closest to the image plane side, and "fLp" is the focal length of a positive lens group included in the lens group arranged closest to the image plane side.

The focal length f2 of the second lens group may satisfy a condition that $0.6 < |f2/fw| < 1.60$.

The zoom lens may satisfy a condition that $0.8 < |fLm/fw| < 2.15$.

According to another embodiment of the invention, a zoom lens comprises, in order from an object side to an image plane side, a first lens group fixed to the image plane during zooming, having a positive refractive power, and including a negative lens group having a negative refractive power, an optical path change member for changing an optical path, and a positive lens group having a positive refractive power, which are arranged in order from the object side; a second lens group having a negative refractive power and including a negative lens group having a negative refractive power and a positive lens group having a positive refractive power which are arranged in order from the object side with an air gap; a third lens group fixed to the image plane during zooming and having a positive refractive power; and at least one lens group having a positive refractive power, wherein a lens group arranged closest to the image plane comprises a positive lens group having a positive refractive power and a negative lens group having a negative refractive power which are arranged in order from the object side with an air gap, and the zoom lens satisfies the following conditions:

$1.4 < |fLG1/fw| < 5.8;$ $vdGp > 63.0;$ and $NdGp < 1.63,$ wherein "fLG1" is the total focal length of a lens group arranged closer to the object side than the optical path change member in the first lens group, "fw" is the focal length of the overall zoom lens at a wide angle position, and "vdGp" and "NdGp" are respectively the Abbe number at a d-line and the refractive index at a d-line of a positive lens included in a positive lens group of the lens group arranged closest to the image plane side.

The zoom lens may satisfy a condition that $-4.8 < Ept/Yimg < -2.5$, wherein "Ept" is the position of an exit pupil at a telephoto position, and "Yimg" is the maximum image height on the image plane.

The focal length f2 of the second lens group may satisfy a condition that $0.6 < |f2/fw| < 1.60$.

The zoom lens may satisfy a condition that $0.3 < |fLm/fLp| < 1.53$, wherein "fLm" is the focal length of a negative lens group included in the lens group arranged closest to the image plane side, and "fLp" is the focal length of a positive lens group included in the lens group arranged closest to the image plane side. The zoom lens may satisfy a condition that $0.8 < |fLm/fw| < 2.15$.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
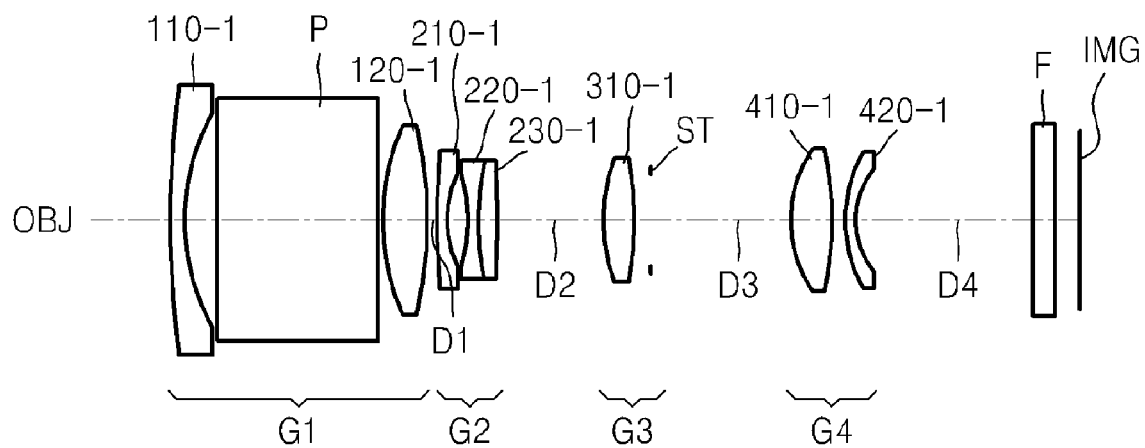
FIG. 1 is a side view illustrating the optical arrangement of a zoom lens according to an embodiment of the invention and the movement of the zoom lens during zooming.
Figure 1:
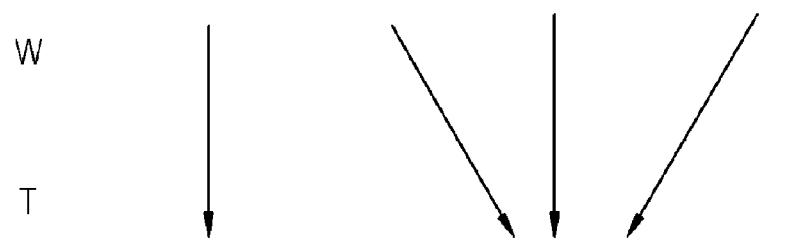

The attached drawings for illustrating exemplary embodiments of the invention are referred to in order to gain a sufficient understanding of the invention, the merits thereof, and the objectives accomplished by the implementation of the invention. Hereinafter, invention will be described in detail by explaining exemplary embodiments of the invention with reference to the attached drawings. Like reference numerals in the drawings denote like elements.

FIGS. 1, 5, 9, and 13 illustrate the optical arrangements of zoom lenses according to embodiments of the invention. Referring to these drawings, each zoom lens includes a first lens group G1, a second lens group G2, a third lens group G3, and a plurality of lens groups having a positive refractive power, in order from an object OBJ side to an image plane IMG side.

The first lens group G1 is a lens group fixed with respect to the IMG during zooming and includes a negative lens group having a negative refractive power, an optical path change member P for bending an optical path, and a positive lens group having a positive refractive power. The negative lens group may be formed of a single lens. The optical path change member P may be a reflection member, for example, a prism.

The second lens group G2 includes a negative lens group having a negative refractive power and a positive lens group having a positive refractive power, which are arranged in order from the OBJ side with an air gap. The lens group arranged closest to the IMG side includes a positive lens group having a positive refractive power and a negative lens group having a negative refractive power, which are arranged in order from the OBJ side with an air gap.

In the zoom lenses according to the embodiments of the invention, the optical path change member P is included in the first lens group G1 to make the optical path refracted within an optical system, thereby facilitating the miniaturization of a device. Accordingly, the thickness of a camera is not dependent on the total number of lenses constituting a zoom lens. In this case, the thickness of a camera may be rather dependent on the thickness of the lenses arranged at the OBJ side of the optical path change member P and the size in a diametric direction of an optical element arranged closer at the IMG side than the optical path change member P. Thus, since the lens group having a positive refractive power and capable of converging light rays is used as a fixed lens group and a movable lens group is arranged close to the IMG side, the size in a diametric direction of an optical element arranged closer to the IMG side than the optical path change member P may be miniaturized.

The zoom lens of various embodiments of the invention is configured to satisfy the following conditions.

(1)  $1.4 < |fLG1/fw| < 5.8$

Here, "fLG1" is the total focal length of a lens group arranged closer to the OBJ than the optical path change member P in the first lens group G1. Also, "fw" is the focal length of a zoom lens at the wide angle position.

The above condition defines the focal length of a negative lens group arranged closer to the OBJ side than the optical path change member P. If the |fLG1/fw| is lower than the lower limit, that is, the focal length of the negative lens group arranged closer to the OBJ side than the optical path change member P of the first lens group G1 is too small, the amount of distortion generated at the wide angle position becomes too large. Also, if the value of "|fLG1/fw|" is higher than the upper limit, that is, the focal length of the negative lens group arranged closer to the OBJ side than the optical path change member P in the first lens group G1 is too large, the position of an entrance pupil is difficult to be arranged close to the OBJ and thus it may be difficult to achieve the miniaturization of the optical path change member P. When the following condition is satisfied, the miniaturization may be further facilitated.

$$1.4 < |fLG1/fw| < 2.69 \quad (2)$$

Also, in the zoom lenses according to the embodiments of the invention, the second lens group G2 includes a negative lens group having a negative refractive power and a positive lens group having a positive refractive power, which are arranged in order from the OBJ side with the air gap therebetween. When the negative refractive power of the second lens group G2 is formed as close to the OBJ side as possible, the position of an entrance pupil at the wide angle position is as close to the OBJ side as possible. Thus, the miniaturization of the optical path change member P may be easily achieved.

Furthermore, the zoom lenses of the embodiments of the invention may satisfy the following condition.

$$-4.8 < Ept/Yimg < -2.5 \quad (3)$$

Here, "Ept" is the position of an exit pupil at the telephoto position and "Yimg" is the maximum image height on the IMG. The sign of "Ept" is positive at the right of the IMG and negative at the left of the IMG.

The above condition defines the ratio of the exit pupil position at the telephoto position and the maximum image height on an image photographing surface, the IMG. If the value of "Ept/Yimg" is lower than the lower limit, the exit pupil position is separated away from the IMG so that the effective diameter of a lens arranged closest to the IMG increases. Also, if the value of "Ept/Yimg" is higher than the lower limit, the angle of a light ray incident on the IMG increases excessively so that the amount of light therearound may be deteriorated.

Furthermore, in the zoom lenses according to the embodiments of the invention, the lens group arranged closest to the IMG side includes a positive lens group having a positive refractive power and a negative lens group having a negative refractive power, which are arranged in order from the OBJ side with the air gap therebetween. By using the arrangement of refractive powers in a last lens group, the exit pupil position may be easy to be close to the IMG side and the effective diameter of a last lens decreases. Also, since the first lens group G1 has a negative refractive power at the position closest to the OBJ side, the negative lens group of the last lens group arranged closest to the IMG side has an effect of offsetting aberration such as distortion or curvature of curve generated in the negative lens group of the first lens group G1 arranged closest to the OBJ, thereby providing an effective aberration correction.

Furthermore, the zoom lenses of the embodiments of the invention may satisfy the following condition.

$$0.6 < |f2/fw| < 1.60 \quad (4)$$

Here, "f2" is the focal length of the second lens group G2. The above condition defines the focal length of the second lens group G2. If the value of "|f2/fw|" is lower than the lower limit, that is, the focal length of the second lens group G2 is decreased, the generation of distortion and curvature of field at the wide angle position increase and simultaneously eccentricity sensitivity increases so that a high assembly accuracy is required. If the value of "|f2/fw|" is higher than the upper limit, that is, the focal length of the second lens group G2 increases, the amount of movement of the second lens group G2 increases during zooming so that the entire optical system may be made large.

Also, to configure an optical system having a high image forming performance, an aspherical surface is needed. The aspherical surface may be used in the third lens group G3 having a positive refractive power. When the third lens group G3 has an aspherical surface shape in which a positive refractive power decreases closer to a paraxial, the amount of generation of spherical aberration at the telephoto position may be restricted.

The zoom lenses of the embodiments of the invention may satisfy the following condition.

$$0.3 < |fLm/fLp| < 1.53 \quad (5)$$

Here, "fLm" is the focal length of a negative lens group having a negative refractive power in a lens group arranged closest to the IMG side. "fLp" is the focal length of a positive lens group having a positive refractive power in a lens group arranged closest to the IMG side.

The above condition defines the ratio of the focal length of a negative lens group having a negative refractive power and a positive lens group having a positive refractive power in the lens group arranged closest to the IMG side. If the value of "|fLm/fLp|" is lower than the lower limit, that is, the focal length of the positive lens group increases, it is difficult to achieve the miniaturization of the effective diameters of the positive lens group and the negative lens group. If the value of "|fLm/fLp|" is higher than the upper limit, that is, the focal length of the negative lens group increases, it is difficult to achieve the miniaturization of the effective diameter of the negative lens group.

The zoom lenses of the embodiments of the invention may satisfy the following condition.

$$0.8 < |fLm/fw| < 2.15 \quad (6)$$

The above condition defines the focal length of a negative lens group having a negative refractive power in the lens group arranged closest to the IMG side. If the value of "|fLm/fw|" is lower than the lower limit, that is, the focal length of the negative lens group decreases, the generation of distortion and curvature of field increases and simultaneously eccentricity sensitivity increases so that a high assembly accuracy is required. If the value of "|fLm/fw|" is higher than the upper limit, that is, the focal length of the negative lens group increases, it is difficult to achieve the miniaturization of the effective diameter of the negative lens group.

The zoom lenses of the embodiments of the invention may satisfy the following conditions.

$$vdGp > 63.0 \quad (7)$$

$$(8) \quad NdGp < 1.63$$

Here, "vdGp" and "NdGp" are respectively the Abbe number at a d-line and the refractive index at a d-line of a positive lens included in a positive lens group of the lens group arranged closest to the IMG side.

The above condition defines the material of the positive lens included in the positive lens group arranged at the OBJ side of the last lens group. When the conditions are satisfied, chromatic aberration and curvature of field may be corrected in balance.

The detailed structures and lens data of zoom lenses according to various embodiments of the invention will be described below. The aspherical surface in the embodiments of the invention may be defined as follows.

$$Z = \frac{Ch^2}{1+\sqrt{1-\varepsilon C^2 h^2}} + A4 \cdot h^4 + A6 \cdot h^6 + A8 \cdot h^8 + A10 \cdot h^{10} \quad (9)$$

Here, "h" denotes the height of a lens in a vertical direction with respect to an optical axis, "Z" denotes the distance from the height "h" to the vertex of a lens in a direction along the optical axis, "C" denotes the curvature of a paraxial, "E" denotes a conic constant, and "A4", "A6", "A8", and "A10" denote aspherical surface coefficients.

In the following description, "f" denotes the total focal length of the overall zoom optical system, "Fno" denotes an F number, and "ω" denotes a half viewing angle. An asterisk on a surface number denotes that the surface is an aspherical surface. In each embodiment, the variable distances at the wide angle position, the middle position, and the telephoto position are respectively indicated by D1, D2, D3, and D4.

First Embodiment

FIG. 1 illustrates a zoom lens according to an embodiment of the invention. Referring to FIG. 1, the zoom lens according to the present embodiment includes a first lens G1 having a positive refractive power, a second lens G2 having a negative refractive power, a third lens G3 having a positive refractive power, and a fourth lens G4 having a positive refractive power, which are arranged in order from the object OBJ side to the image plane IMG side. The IMG is an image photographing surface of a photographing apparatus (not shown) such as charge coupled device (CCD) or a complementary metal-oxide semiconductors (CMOS). An infrared filter F is arranged between the fourth lens group G4 and the IMG.

The first lens group G1 includes a first lens 110-1 that is a negative lens and concave toward the IMG side, the optical path change member P, and a second lens 120-1 that is a positive biconvex lens. The second lens group G2 includes a third lens 210-1 that is a negative lens and concave toward the IMG side, a fourth lens 220-1 that is a biconcave lens, and a fifth lens 230-1 that is a positive lens. The fourth lens 220-1 and the fifth lens 230-1 make a doublet lens. The third lens group G3 includes a sixth lens 310-1 that is a positive lens in which both surfaces are aspherical. The fourth lens group G4 includes a seventh lens 410-1 that is a positive lens in which both surfaces are aspherical and an eighth lens 420-1 that is a negative lens. During the zooming from the wide angle position W to the telephoto position T, the first and third lens groups G1 and G3 are fixed, whereas the second and fourth lens groups G2 and G4 are moved. A stop ST is arranged at the IMG side of the third lens group G3.

Figure 2:
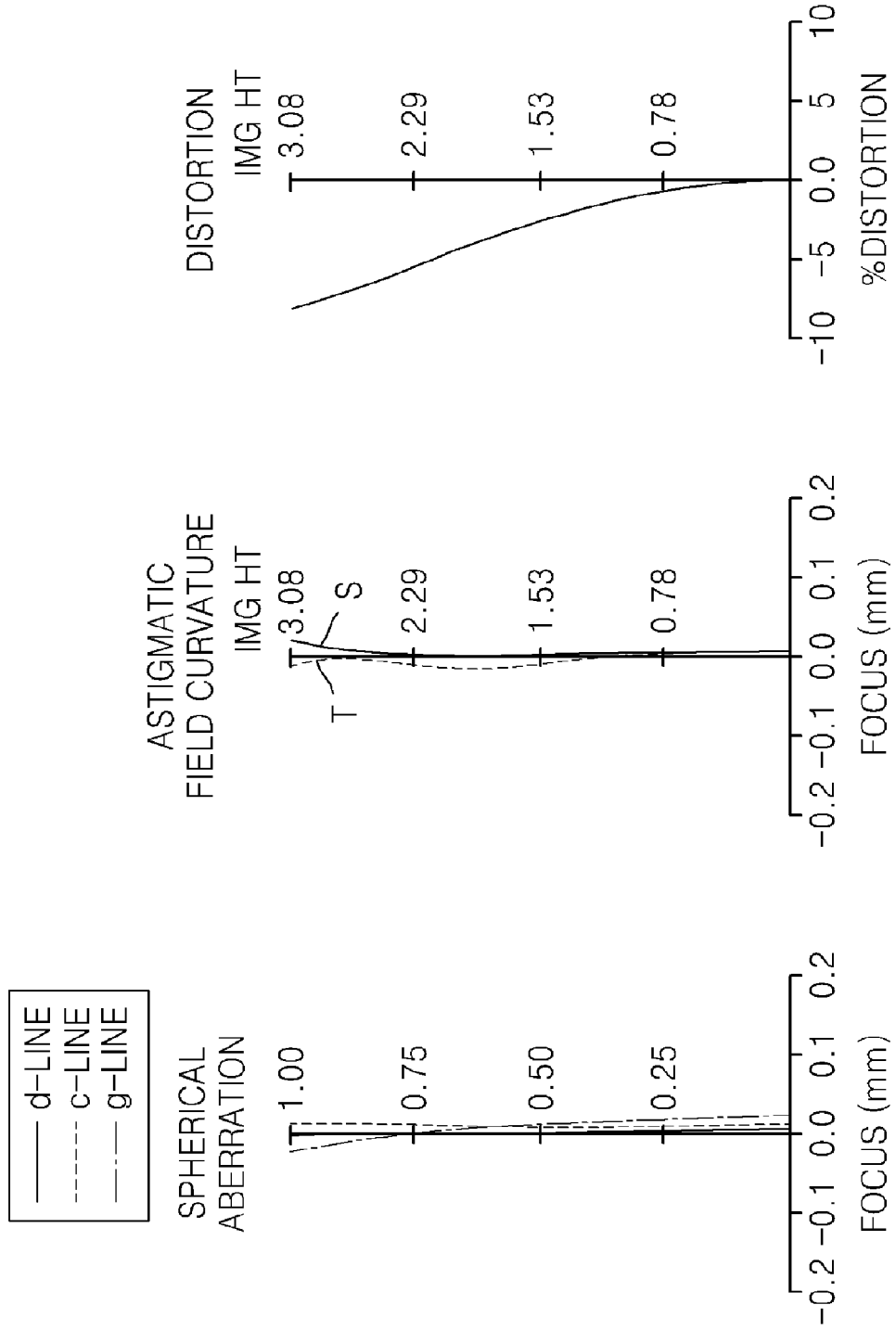
FIGS. 2, 3, and 4 are aberration diagrams showing spherical aberration, astigmatic field curvature, and distortion of the zoom lens of FIG. 1, respectively operating at the wide angle position, the middle position, and the telephoto position.
Figure 3:
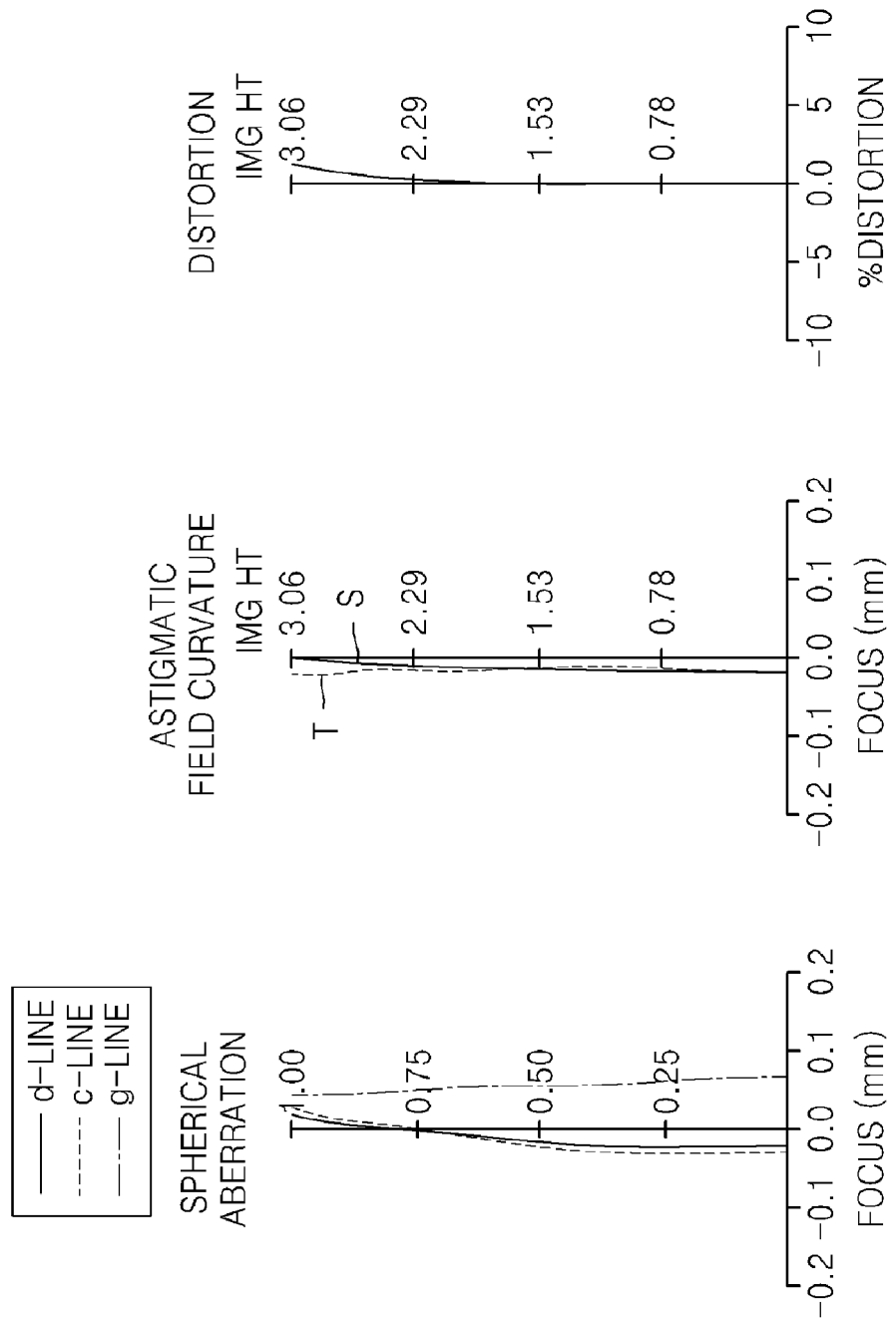
Figure 4:
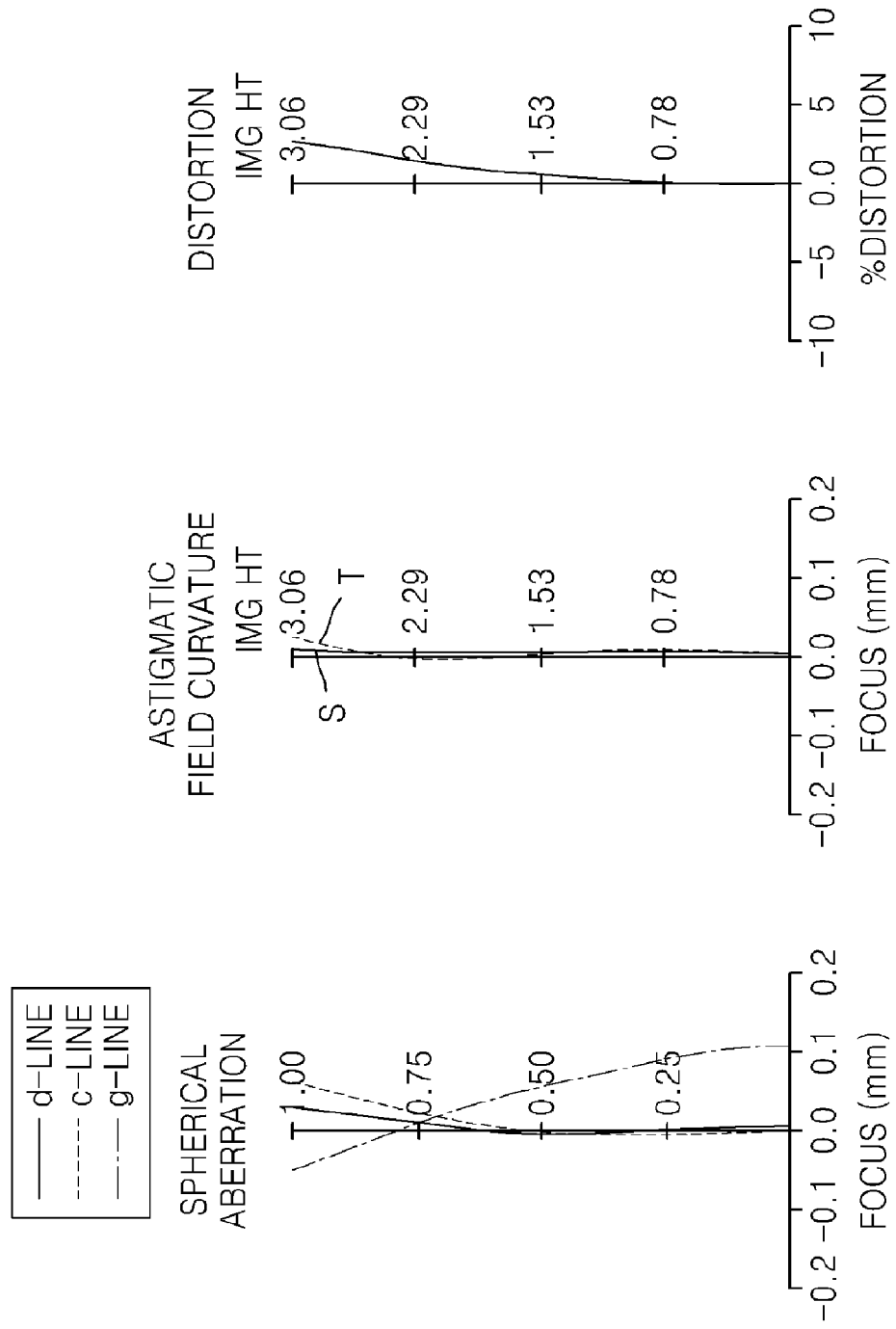

FIGS. 2-4 are aberration diagrams showing longitudinal spherical aberration, astigmatic field curvature, and distortion of the zoom lens of FIG. 1, respectively operating at the wide angle position, the middle position, and the telephoto position. Referring to FIGS. 2-4, the longitudinal spherical aberration appears with respect to light having a wavelength of 656.28 nm (a c-line), 587.56 nm (a d-line), or 435.83 nm (a g-line). While the horizontal axis denotes defocus, the vertical axis denotes a rate to an open F value. In the astigmatic field curvature, the horizontal axis denotes defocus and the vertical axis denotes the height of an image IMG HT. A solid line S denotes a sagittal image plane and a dashed line F denotes a meridional image plane.

The following tables show the lens data according to the present embodiment.

Fno 3.47~3.97~4.66
f 4.65~7.81~13.52
ω 35.64~21.12~12.42
D1 0.350~2.236~3.870
D2 3.871~1.985~0.350
D3 5.086~3.033~1.021
D4 6.483~8.536~10.548

| Surface | Radius of Curvature (R) | Thickness (D) | Refractive Index (nd) | Abbe No. (vd) |
|---|---|---|---|---|
| 1 | 47.991 | 0.520 | 1.92286 | 20.88 |
| 2 | 8.288 | 1.155 | | |
| 3 | INF | 5.900 | 1.75890 | 43.93 |
| 4 | INF | 0.200 | | |
| 5* | 8.528 | 1.594 | 1.77377 | 47.17 |
| 6* | −15.074 | D1 | | |
| 7 | 25.800 | 0.380 | 1.83481 | 42.72 |
| 8 | 4.616 | 0.779 | | |
| 9 | −5.502 | 0.330 | 1.77250 | 49.62 |
| 10 | 9.595 | 0.754 | 1.94595 | 17.98 |
| 11 | −65.051 | D2 | | |
| 12* | 6.541 | 1.078 | 1.49710 | 81.56 |
| 13* | −17.855 | 0.674 | | |
| 14 | INF | D3 | | |
| 15* | 4.137 | 1.525 | 1.49710 | 81.56 |
| 16* | −12.618 | 0.480 | | |
| 17 | 5.146 | 0.400 | 1.94595 | 17.98 |

-continued

Fno 3.47~3.97~4.66
f 4.65~7.81~13.52
ω 35.64~21.12~12.42
D1 0.350~2.236~3.870
D2 3.871~1.985~0.350
D3 5.086~3.033~1.021
D4 6.483~8.536~10.548

| | | | | |
|---|---|---|---|---|
| 18 | 3.166 | D4 | | |
| 19 | INF | 0.800 | 1.51680 | 64.20 |
| 20 | INF | 0.900 | | |

| Surface | ϵ | A4 | A6 | A8 | A10 |
|---|---|---|---|---|---|
| 5 | 1.0000 | −0.318865E−03 | 0.218653E−04 | −0.179184E−05 | 0.120754E−06 |
| 6 | 1.0000 | 0.281187E−04 | 0.329931E−04 | −0.277126E−05 | 0.161242E−06 |
| 12 | 1.0000 | −0.477065E−03 | −0.229241E−03 | 0.668947E−04 | −0.832781E−05 |
| 13 | 1.0000 | 0.495287E−03 | −0.240141E−03 | 0.673197E−04 | −0.810232E−05 |
| 15 | 1.0000 | −0.127021E−02 | −0.248685E−03 | 0.554311E−04 | −0.825283E−05 |
| 16 | 1.0000 | 0.141726E−02 | −0.222841E−03 | 0.499010E−04 | −0.792760E−05 |

Second Embodiment

Figure 5:
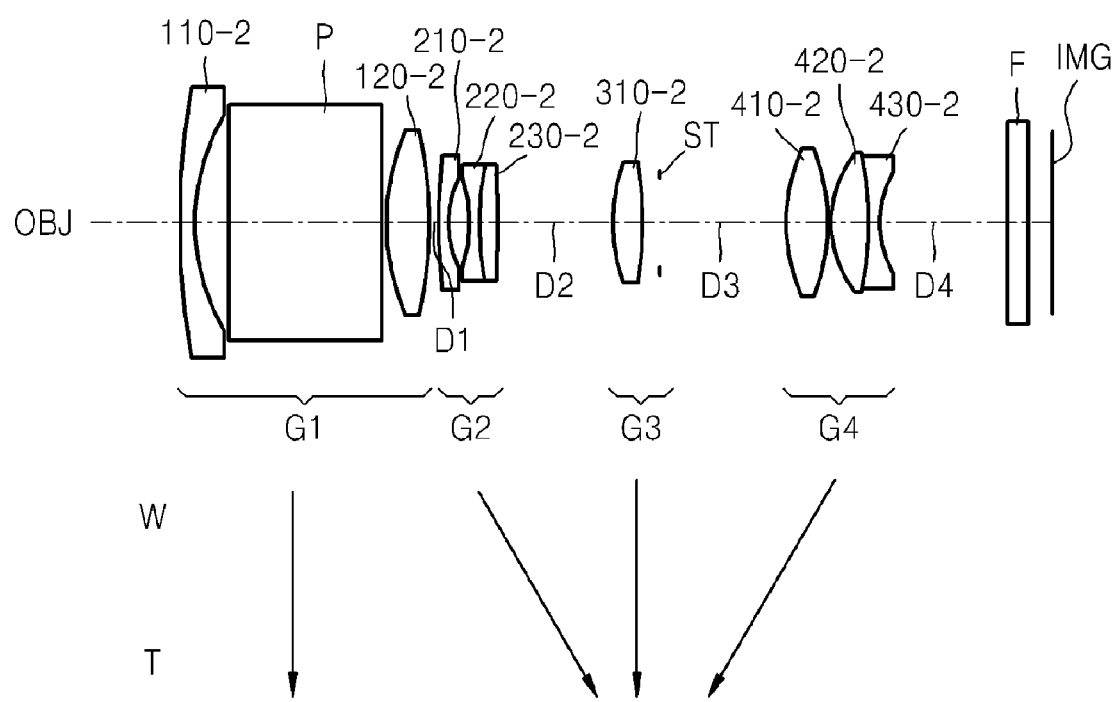
FIG. 5 is a side view illustrating the optical arrangement of a zoom lens according to another embodiment of the invention and the movement of the zoom lens during zooming.

FIG. 5 illustrates a zoom lens according to another embodiment of the invention. Referring to FIG. 5, the zoom lens according to the present embodiment includes a first lens G1 having a positive refractive power, a second lens G2 having a negative refractive power, a third lens G3 having a positive refractive power, and a fourth lens G4 having a positive refractive power, which are arranged in order from the object OBJ side to the image plane IMG side.

The first lens group G1 includes a first lens 110-2 that is a negative lens and concave toward the IMG side, the optical path change member P, and a second lens 120-2 that is a positive biconvex lens. The second lens group G2 includes a third lens 210-2 that is a negative lens and concave toward the IMG side, a fourth lens 220-2 that is a biconcave lens, and a fifth lens 230-2 that is a positive lens. The fourth lens 220-2 and the fifth lens 230-2 make a doublet lens. The third lens group G3 includes a sixth lens 310-2 that is a positive lens in which both surfaces are aspherical. The fourth lens group G4 includes a seventh lens 410-2 that is a positive lens in which both surfaces are aspherical, an eighth lens 420-2 that is a positive lens, and a ninth lens 430-2 that is a negative lens. The eighth lens 420-2 and the ninth lens 430-2 make a doublet lens.

During the zooming from the wide angle position W to the telephoto position T, the first and third lens groups G1 and G3 are fixed, whereas the second and fourth lens groups G2 and G4 are moved. The stop ST is arranged at the IMG side of the third lens group G3. The infrared filter F is arranged between the fourth lens group G4 and the IMG.

Figure 6:
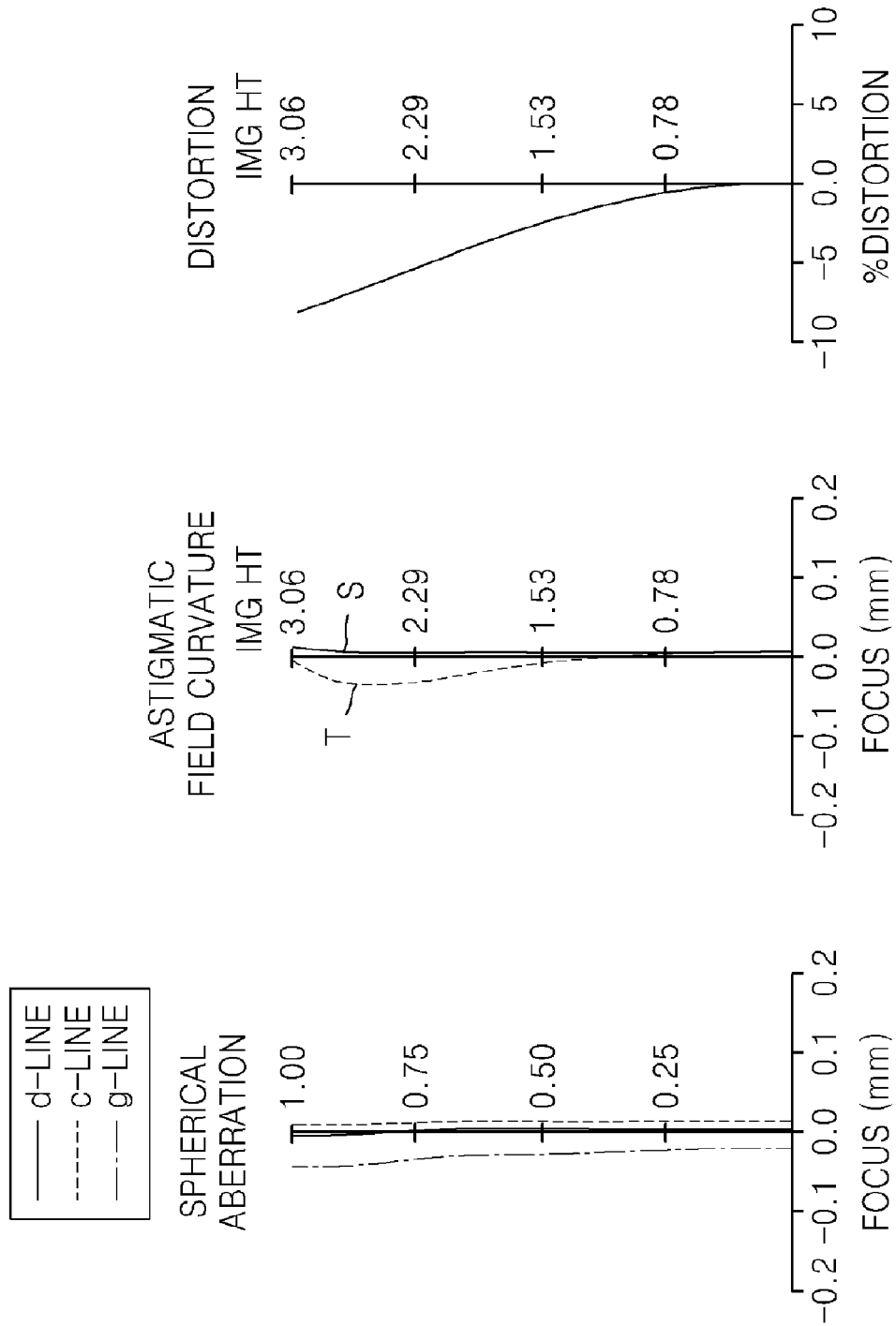
FIGS. 6, 7, and 8 are aberration diagrams showing spherical aberration, astigmatic field curvature, and distortion of FIG. 5, respectively operating at the wide angle position, the middle position, and the telephoto position.
Figure 7:
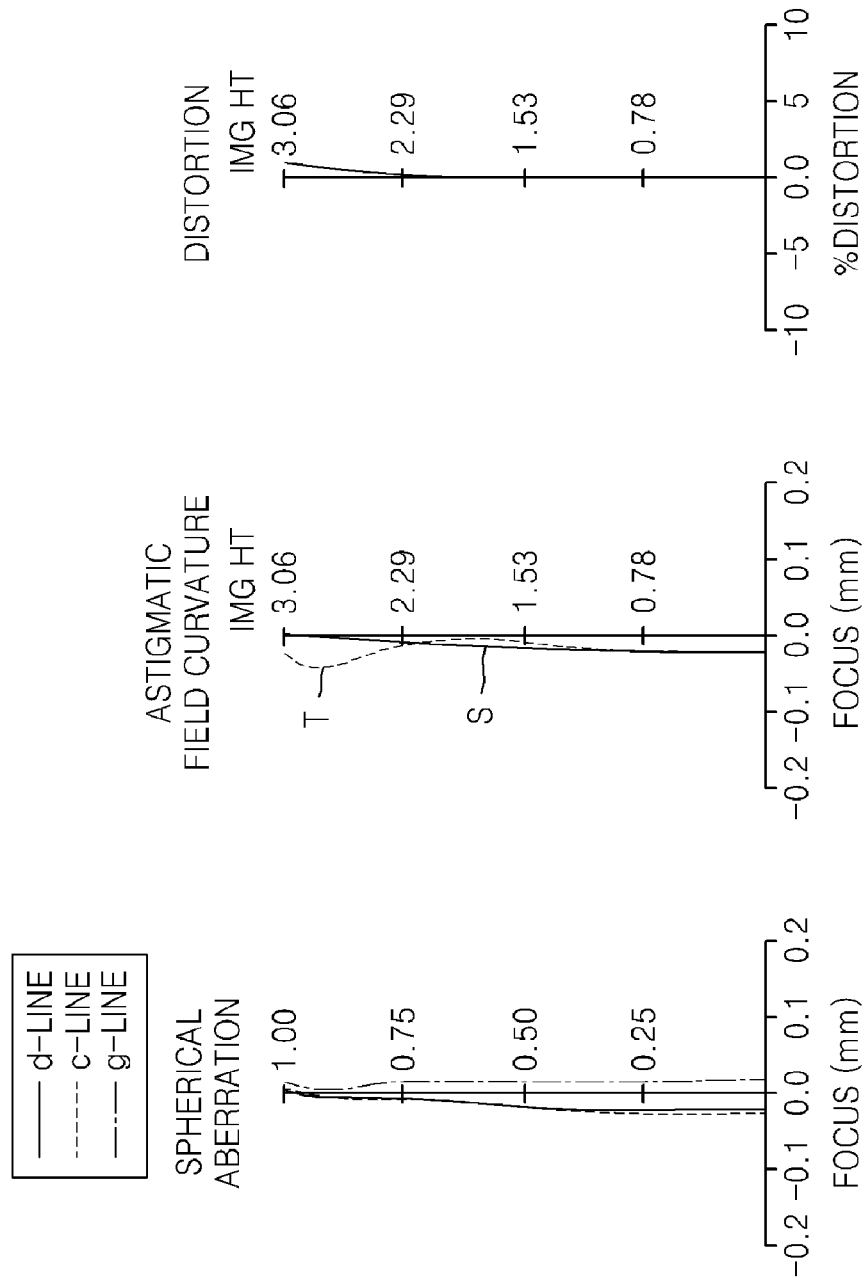
Figure 8:
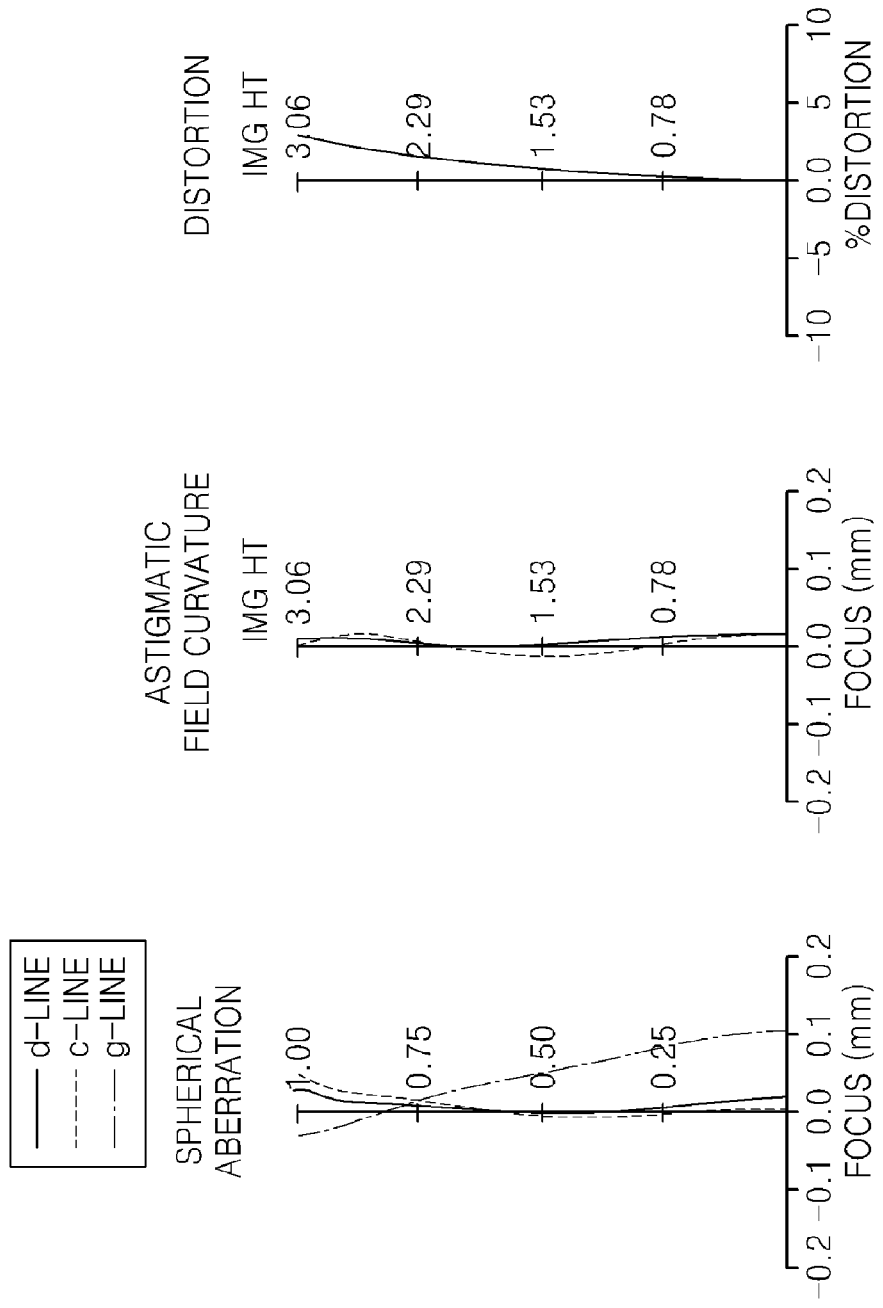

FIGS. 6-8 are aberration diagrams showing longitudinal spherical aberration, astigmatic field curvature, and distortion of the zoom lens of FIG. 5, respectively operating at the wide angle position, the middle position, and the telephoto position. The following tables show the lens data according to the present embodiment.

Fno 3.42~3.96~4.66
f 4.62~7.78~13.46
ω 37.36~22.15~12.98
D1 0.350~2.416~4.279
D2 4.279~2.213~0.350
D3 4.651~2.819~1.005
D4 4.664~6.497~8.310

| Surface | Radius of Curvature (R) | Thickness (D) | Refractive Index (nd) | Abbe No. (vd) |
|---|---|---|---|---|
| 1 | 25.697 | 0.515 | 1.92286 | 20.88 |
| 2 | 6.883 | 1.270 | | |
| 3 | INF | 5.660 | 1.75890 | 43.93 |
| 4 | INF | 0.205 | | |
| 5* | 8.680 | 1.520 | 1.77377 | 47.17 |
| 6* | −16.273 | D1 | | |
| 7 | 23.147 | 0.380 | 1.88300 | 40.80 |
| 8 | 5.118 | 0.750 | | |
| 9 | −5.341 | 0.330 | 1.80420 | 46.50 |
| 10 | 14.767 | 0.734 | 1.94595 | 17.98 |
| 11 | −20.861 | D2 | | |
| 12* | 6.854 | 1.064 | 1.49710 | 81.56 |
| 13* | −18.211 | 0.651 | | |
| 14 | INF | D3 | | |
| 15* | 5.758 | 1.541 | 1.49710 | 81.56 |
| 16* | −7.547 | 0.120 | | |
| 17 | 4.321 | 1.410 | 1.48749 | 70.45 |

-continued

Fno 3.42~3.96~4.66
f 4.62~7.78~13.46
ω 37.36~22.15~12.98
D1 0.350~2.416~4.279
D2 4.279~2.213~0.350
D3 4.651~2.819~1.005
D4 4.664~6.497~8.310

| | | | | |
|---|---|---|---|---|
| 18 | −10.770 | 0.400 | 1.90366 | 31.32 |
| 19 | 3.692 | D4 | | |
| 20 | INF | 0.800 | 1.51680 | 64.20 |
| 21 | INF | 0.900 | | |

| Surface | ε | A4 | A6 | A8 | A10 |
|---|---|---|---|---|---|
| 5 | 1.0000 | −0.289110E−03 | 0.401930E−05 | 0.728055E−06 | 0.245351E−07 |
| 6 | 1.0000 | −0.790265E−04 | 0.206272E−04 | −0.599415E−06 | 0.726046E−07 |
| 12 | 1.0000 | −0.447687E−03 | −0.190004E−03 | 0.273701E−04 | −0.311555E−05 |
| 13 | 1.0000 | 0.533934E−03 | −0.181448E−03 | 0.194177E−04 | −0.152083E−05 |
| 15 | 1.0000 | −0.204382E−03 | −0.209476E−03 | 0.543469E−04 | −0.688591E−05 |
| 16 | 1.0000 | 0.142392E−02 | −0.217411E−03 | 0.518503E−04 | −0.667259E−05 |

Third Embodiment

Figure 9:
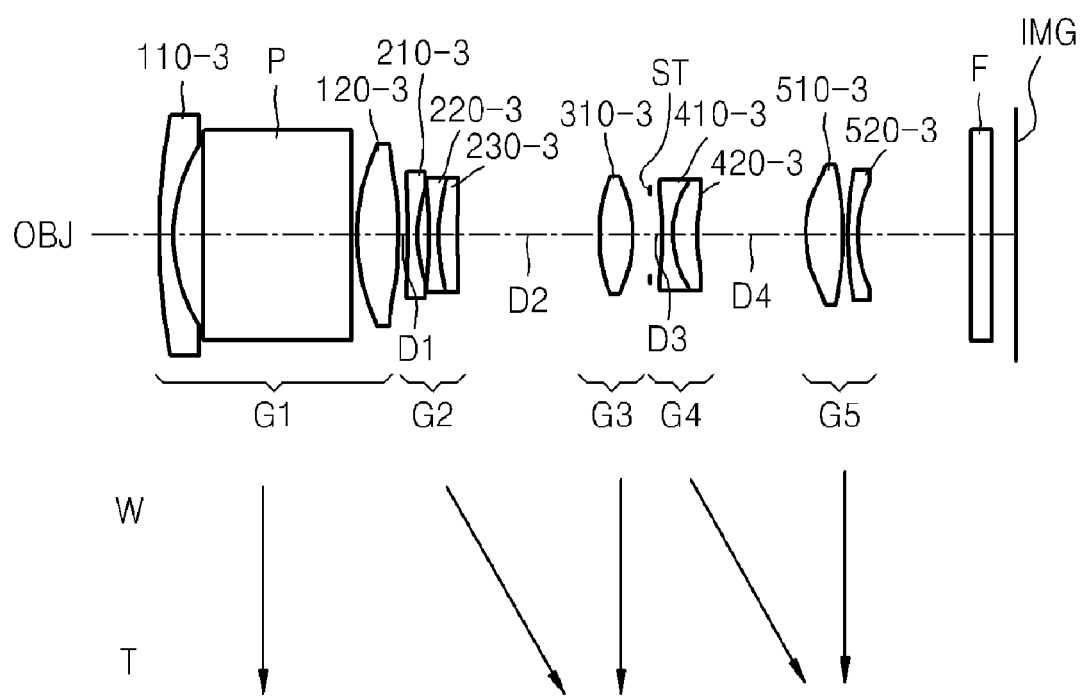
FIG. 9 is a side view illustrating the optical arrangement of a zoom lens according to another embodiment of the invention and the movement of the zoom lens during zooming.

FIG. 9 illustrates a zoom lens according to another embodiment of the invention. Referring to FIG. 9, the zoom lens according to the present embodiment includes a first lens G1 having a positive refractive power, a second lens G2 having a negative refractive power, a third lens G3 having a positive refractive power, a fourth lens G4 having a negative refractive power, and a fifth lens G5 having a positive refractive power, which are arranged in order from the object OBJ side to the image plane IMG side.

The first lens group G1 includes a first lens 110-3 that is a negative lens and concave toward the IMG side, the optical path change member P, and a second lens 120-3 that is a positive biconvex lens in which both surfaces are aspherical. The second lens group G2 includes a third lens 210-3 that is a negative lens and concave toward the IMG side, a fourth lens 220-3 that is a biconcave lens, and a fifth lens 230-3 that is a positive lens. The fourth lens 220-3 and the fifth lens 230-3 make a doublet lens. The third lens group G3 includes a sixth lens 310-3 that is a positive lens in which both surfaces are aspherical. The fourth lens group G4 includes a doublet lens of a seventh lens 410-3 that is a negative lens and an eighth lens 420-3 that is a positive lens. The fifth lens group G5 includes a ninth lens 510-3 that is a positive lens in which both surfaces are aspherical and a tenth lens 520-3 that is a negative lens.

During the zooming from the wide angle position W to the telephoto position T, the first, third, and fifth lens groups G1, G3, and G5 are fixed, whereas the second and fourth lens groups G2 and G4 are moved. The stop ST is arranged at the IMG side of the third lens group G3. The infrared filter F is arranged between the fifth lens group G5 and the IMG.

Figure 10:
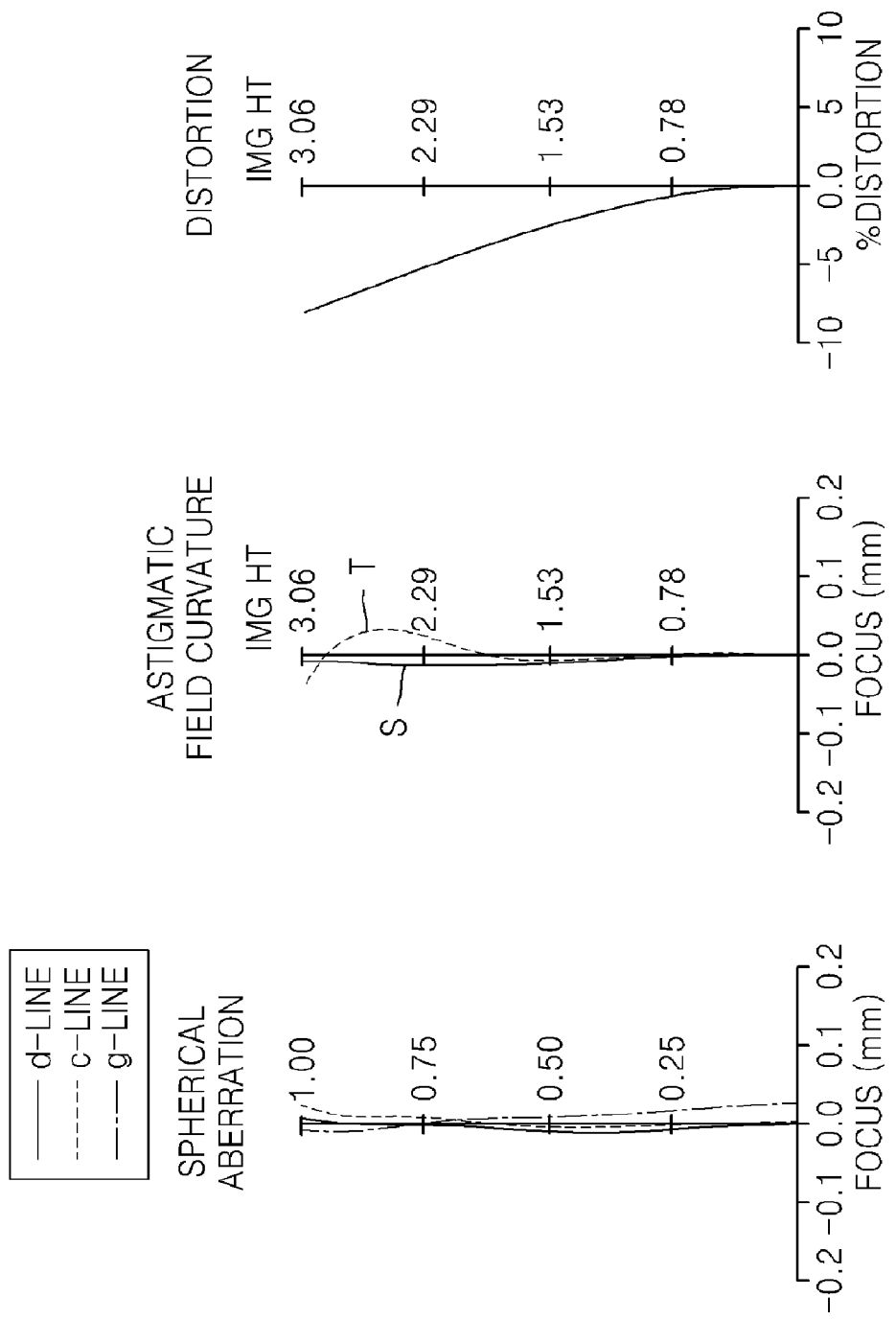
FIGS. 10, 11, and 12 are aberration diagrams showing spherical aberration, astigmatic field curvature, and distortion of FIG. 9, respectively operating at the wide angle position, the middle position, and the telephoto position.
Figure 11:
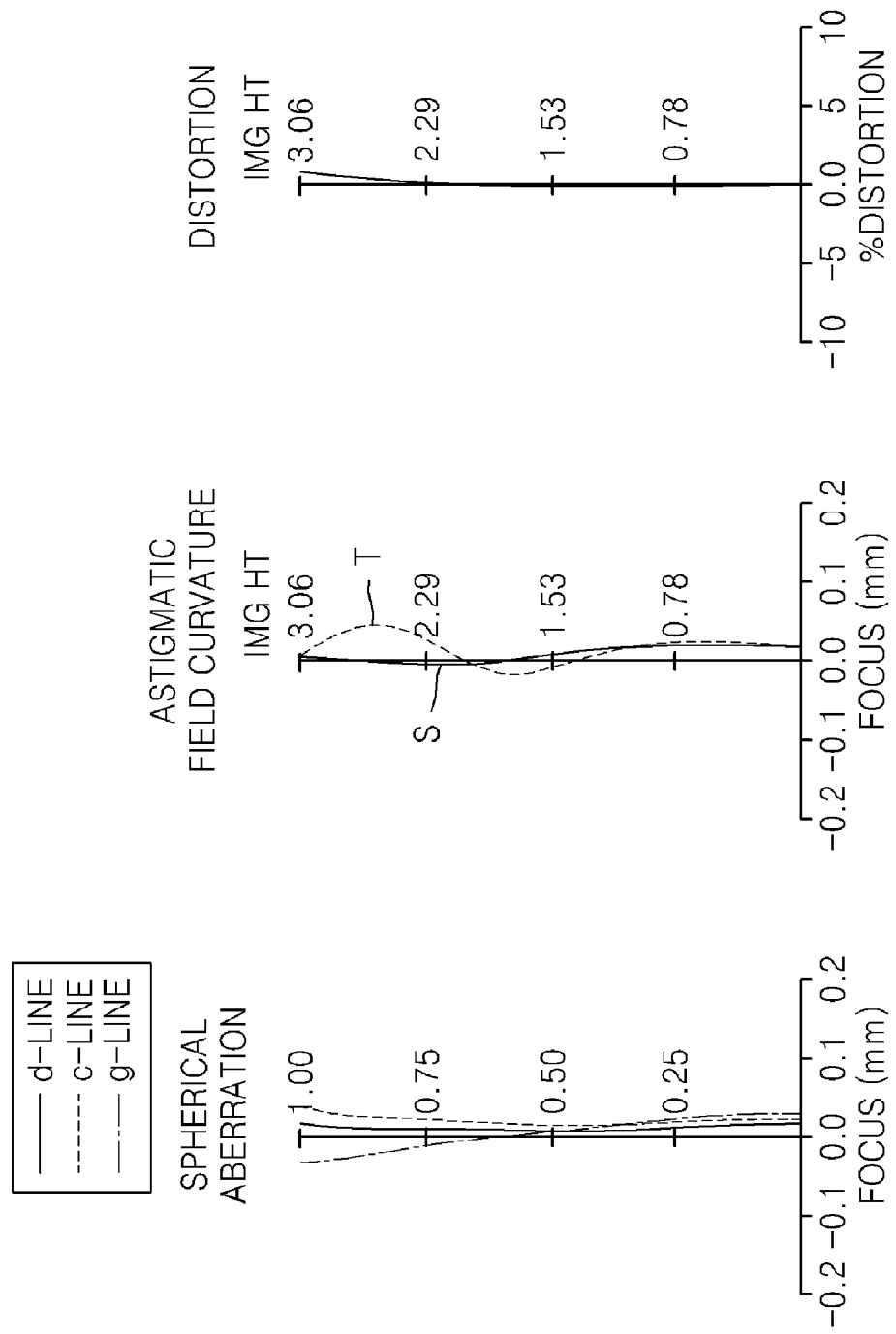
Figure 12:
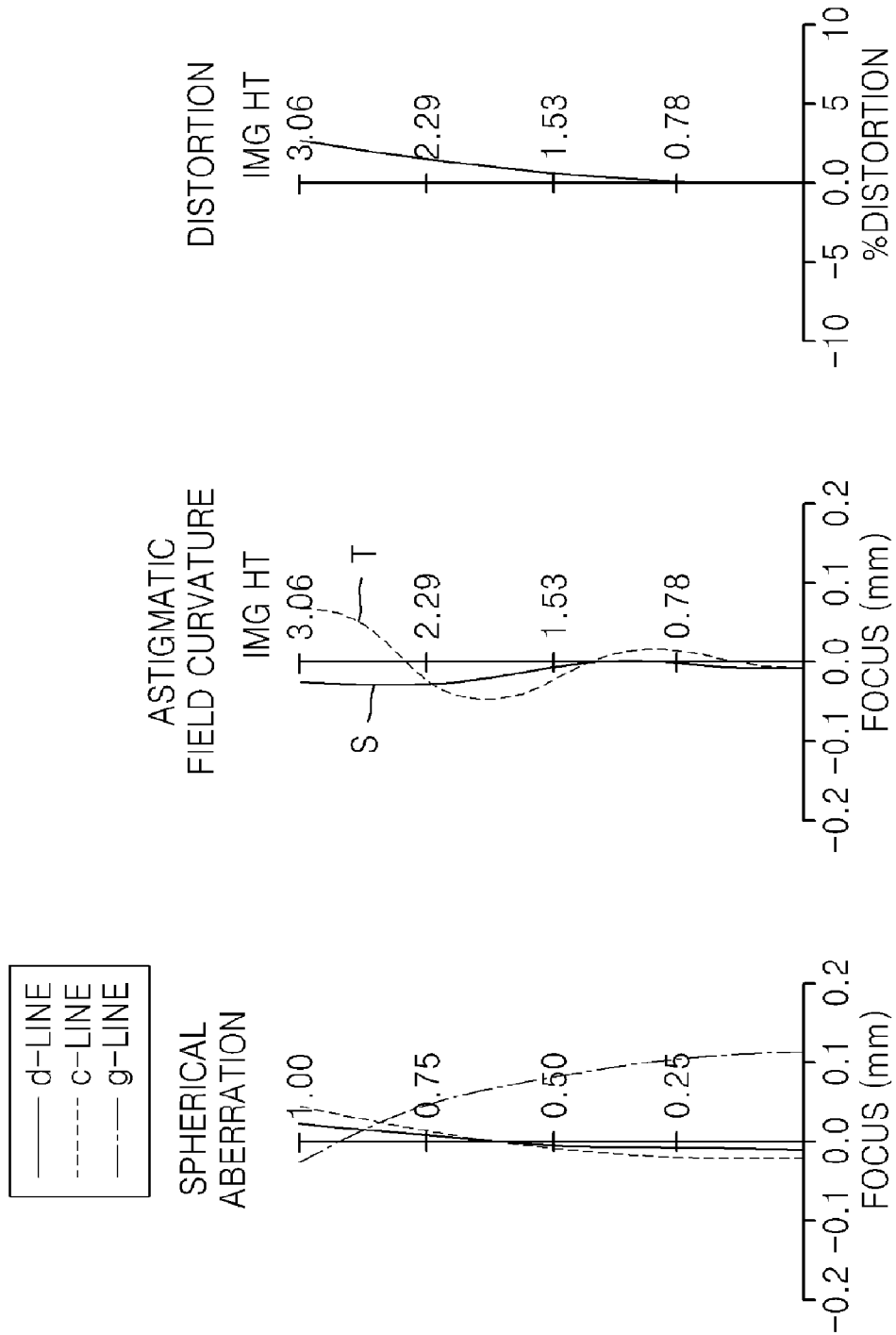

FIGS. 10-12 are aberration diagrams showing longitudinal spherical aberration, astigmatic field curvature, and distortion of the zoom lens of FIG. 9, respectively operating at the wide angle position, the middle position, and the telephoto position. The following tables show the lens data according to the present embodiment.

Fno 3.48~3.85~4.14
f 4.65~7.71~13.52
ω 35.62~21.25~12.42
D1 0.405~3.050~5.559
D2 5.504~2.859~0.350
D3 0.530~2.151~3.892
D4 4.210~2.589~0.848

| Surface | Radius of Curvature (R) | Thickness (D) | Refractive Index (nd) | Abbe No. (vd) |
|---|---|---|---|---|
| 1 | 27.995 | 0.520 | 1.92286 | 20.88 |
| 2 | 6.718 | 1.187 | | |
| 3 | INF | 5.750 | 1.90366 | 31.32 |
| 4 | INF | 0.200 | | |
| 5* | 8.264 | 1.592 | 1.72903 | 54.04 |
| 6* | −16.199 | D1 | | |
| 7 | −33.255 | 0.380 | 1.88300 | 40.80 |
| 8 | 6.840 | 0.457 | | |
| 9 | −16.340 | 0.330 | 1.80420 | 46.50 |
| 10 | 8.199 | 0.732 | 1.94595 | 17.98 |
| 11 | 57.797 | D2 | | |
| 12* | 5.496 | 1.289 | 1.49710 | 81.56 |
| 13* | −5.713 | 0.670 | | |
| 14 | INF | D3 | | |
| 15 | −10.440 | 0.350 | 1.73077 | 40.50 |

-continued

Fno 3.48~3.85~4.14
f 4.65~7.71~13.52
ω 35.62~21.25~12.42
D1 0.405~3.050~5.559
D2 5.504~2.859~0.350
D3 0.530~2.151~3.892
D4 4.210~2.589~0.848

| | | | | |
|---|---|---|---|---|
| 16 | 3.617 | 0.970 | 1.91082 | 35.25 |
| 17 | 13.250 | D4 | | |
| 18* | 4.423 | 1.462 | 1.55332 | 71.68 |
| 19* | −10.431 | 0.166 | | |
| 20 | 16.296 | 0.400 | 1.94595 | 17.98 |
| 21 | 4.773 | 4.422 | | |
| 22 | INF | 0.800 | 1.51680 | 64.20 |
| 23 | INF | 0.900 | | |

| Surface | ϵ | A4 | A6 | A8 | A10 |
|---|---|---|---|---|---|
| 5 | 1.0000 | −0.425028E−03 | 0.490941E−04 | −0.556445E−05 | 0.307597E−06 |
| 6 | 1.0000 | −0.133821E−03 | 0.535430E−04 | −0.575982E−05 | 0.325559E−06 |
| 12 | 1.0000 | −0.122014E−02 | −0.465210E−03 | 0.146461E−03 | −0.187512E−04 |
| 13 | 1.0000 | 0.130530E−02 | −0.396271E−03 | 0.125678E−03 | −0.160501E−04 |
| 18 | 1.0000 | −0.365174E−03 | −0.481212E−03 | 0.104110E−03 | −0.116055E−04 |
| 19 | 1.0000 | 0.370079E−02 | −0.484353E−03 | 0.983538E−04 | −0.116537E−04 |

Fourth Embodiment

Figure 13:
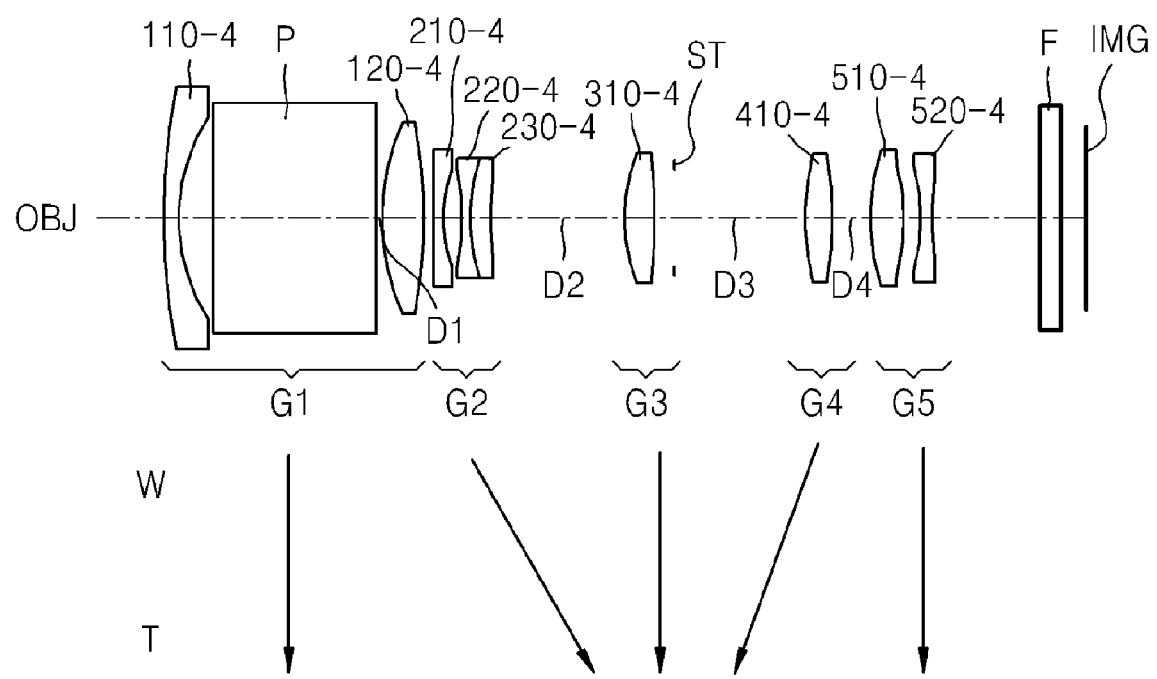
FIG. 13 is a side view illustrating the optical arrangement of a zoom lens according to another embodiment of the invention and the movement of the zoom lens during zooming.

FIG. 13 illustrates a zoom lens according to another embodiment of the invention. Referring to FIG. 13, the zoom lens according to the present embodiment includes a first lens G1 having a positive refractive power, a second lens G2 having a negative refractive power, a third lens G3 having a positive refractive power, a fourth lens G4 having a positive refractive power, and a fifth lens G5 having a negative refractive power, which are arranged in order from the object OBJ side to the image plane IMG side.

The first lens group G1 includes a first lens 110-4 that is a negative lens and concave toward the IMG side, the optical path change member P, and a second lens 120-4 that is a positive biconvex lens. The second lens group G2 includes a third lens 210-4 that is a negative lens and concave toward the IMG side, a fourth lens 220-4 that is a biconcave lens, and a fifth lens 230-4 that is a positive lens. The fourth lens 220-4 and the fifth lens 230-4 make a doublet lens. The third lens group G3 includes a sixth lens 310-4 that is a positive lens in which both surfaces are aspherical. The fourth lens group G4 includes a seventh lens 410-4 that is a positive lens in which both surfaces are aspherical. The fifth lens group G5 includes an eighth lens 510-4 that is a positive lens in which both surfaces are aspherical and a ninth lens 520-4 that is a negative lens.

During the zooming from the wide angle position W to the telephoto position T, the first, third, and fifth lens groups G1, G3, and G5 are fixed, whereas the second and fourth lens groups G2 and G4 are moved. The stop ST is arranged at the IMG side of the third lens group G3. The infrared filter F is arranged between the fifth lens group G5 and the IMG.

Figure 14:
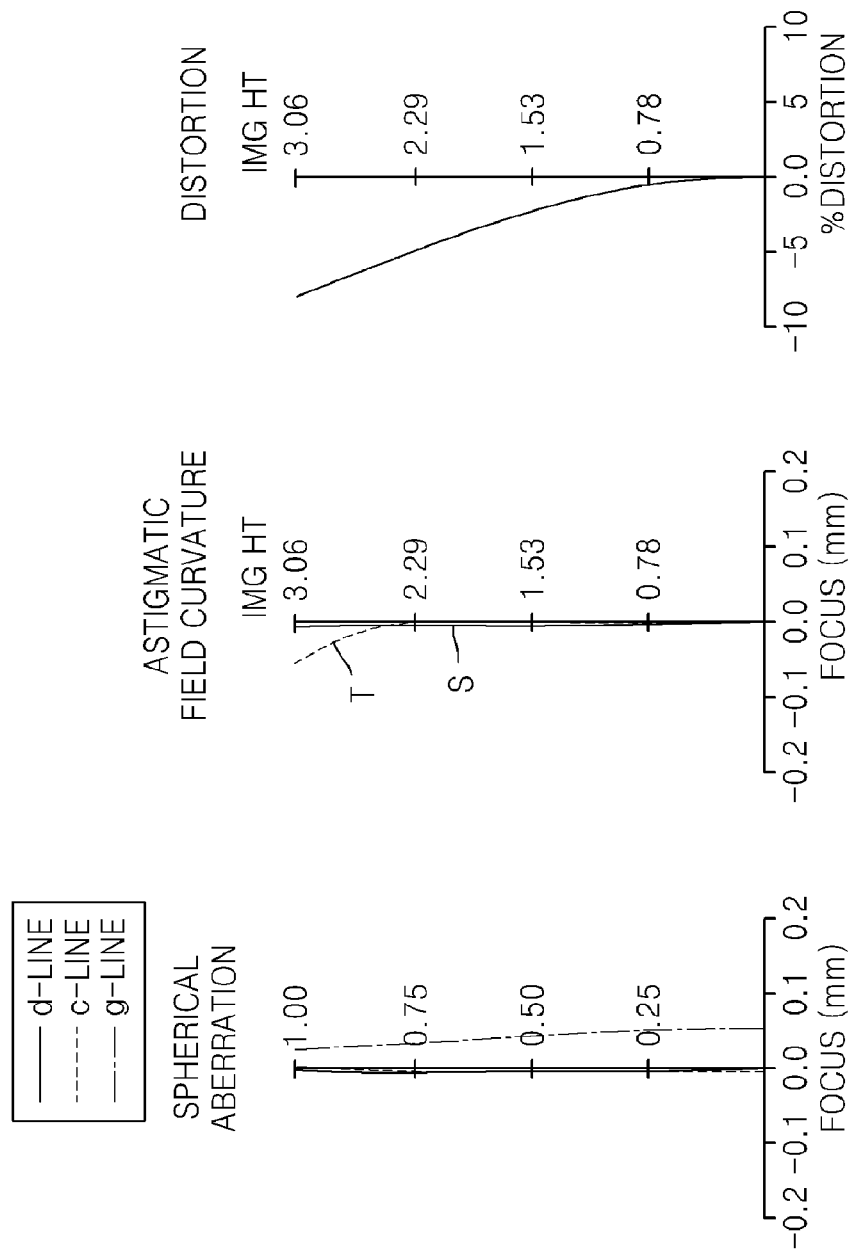
FIGS. 14, 15, and 16 are aberration diagrams showing spherical aberration, astigmatic field curvature, and distortion of FIG. 13, respectively operating at the wide angle position, the middle position, and the telephoto position.
Figure 15:
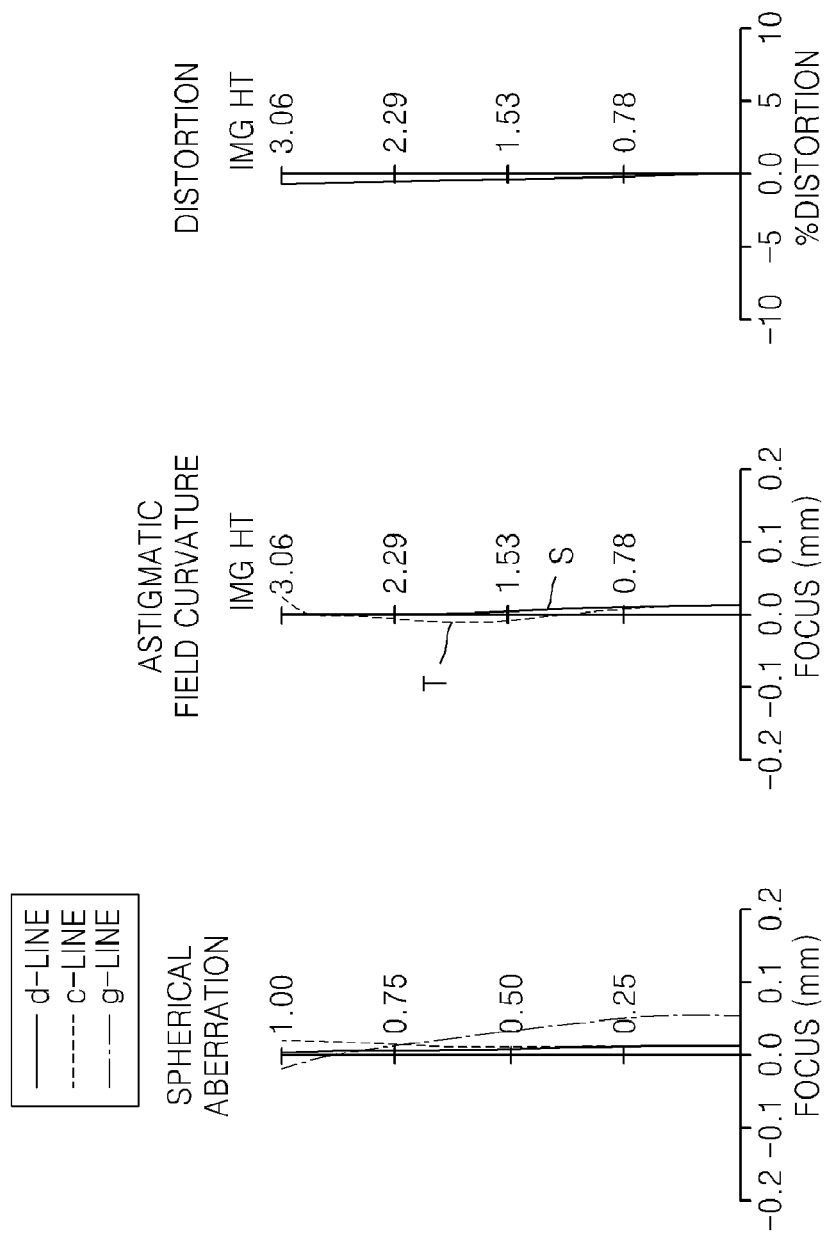
Figure 16:
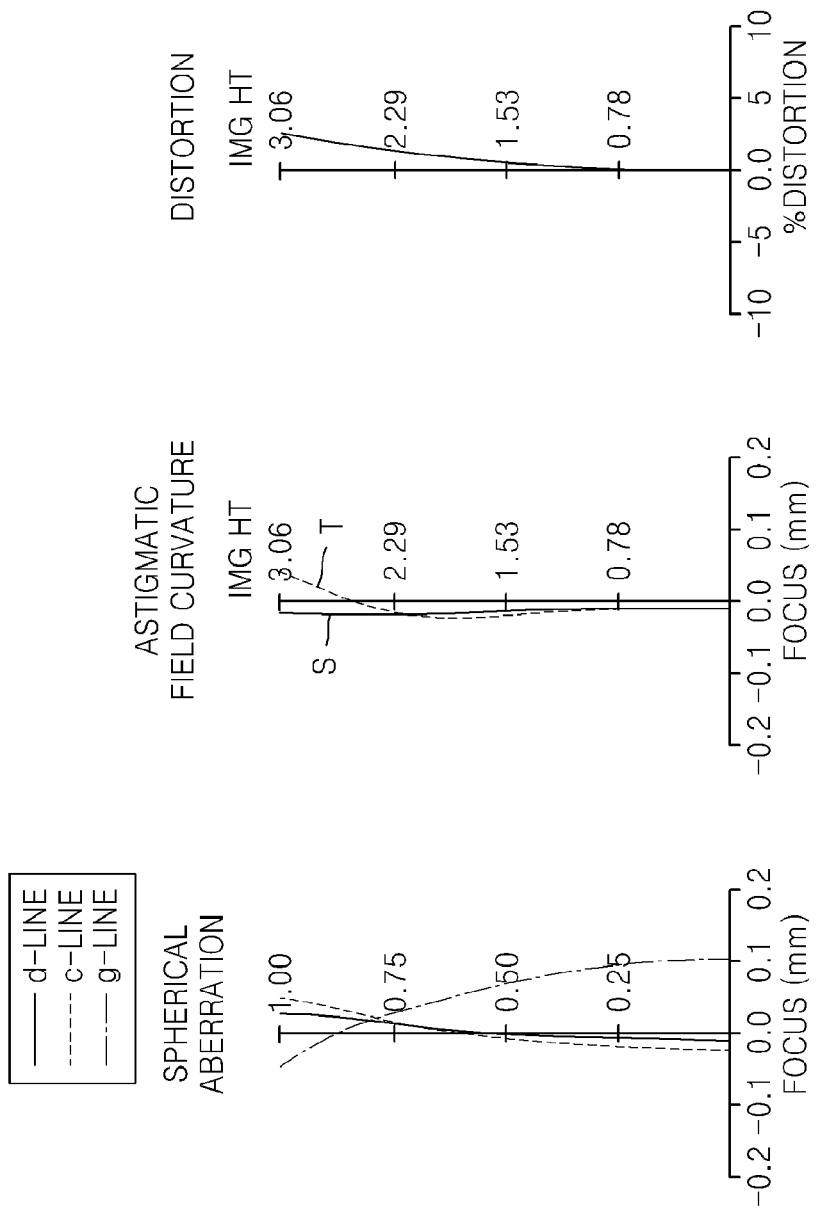

FIGS. 14-16 are aberration diagrams showing longitudinal spherical aberration, astigmatic field curvature, and distortion of the zoom lens of FIG. 13, respectively operating at the wide angle position, the middle position, and the telephoto position. The following tables show the lens data according to the present embodiment.

Fno 3.48~3.81~4.45
f 4.59~7.73~13.38
ω 35.92~21.73~12.54
D1 0.351~2.877~4.812
D2 4.811~2.285~0.350
D3 4.728~2.799~0.588
D4 1.374~3.303~5.514

| Surface | Radius of Curvature (R) | Thickness (D) | Refractive Index (nd) | Abbe No. (vd) |
|---|---|---|---|---|
| 1 | 23.363 | 0.520 | 1.94595 | 17.98 |
| 2 | 6.800 | 1.241 | | |
| 3 | INF | 5.900 | 1.88300 | 40.80 |
| 4 | INF | 0.200 | | |
| 5* | 8.534 | 1.489 | 1.75501 | 51.16 |
| 6* | −18.719 | D1 | | |
| 7 | 103.282 | 0.380 | 1.83481 | 42.72 |
| 8 | 5.289 | 0.628 | | |
| 9 | −11.410 | 0.330 | 1.83481 | 42.72 |
| 10 | 6.870 | 0.769 | 1.94595 | 17.98 |
| 11 | 39.797 | D2 | | |
| 12* | 5.838 | 1.112 | 1.49710 | 81.56 |

-continued

Fno 3.48~3.81~4.45
f 4.59~7.73~13.38
ω 35.92~21.73~12.54
D1 0.351~2.877~4.812
D2 4.811~2.285~0.350
D3 4.728~2.799~0.588
D4 1.374~3.303~5.514

| | | | | |
|---|---|---|---|---|
| 13* | −17.386 | 0.670 | | |
| 14 | INF | D3 | | |
| 15* | 8.999 | 0.980 | 1.49710 | 81.56 |
| 16* | −13.071 | D4 | | |
| 17* | 10.906 | 1.190 | 1.49710 | 81.56 |
| 18* | −8.197 | 0.642 | | |
| 19 | −6.850 | 0.400 | 1.94595 | 17.98 |
| 20 | 16.108 | 3.870 | | |
| 21 | INF | 0.800 | 1.51680 | 64.20 |
| 22 | INF | 0.900 | | |

| Surface | ϵ | A4 | A6 | A8 | A10 |
|---|---|---|---|---|---|
| 5 | 1.0000 | −0.174626E−03 | 0.112437E−04 | −0.163130E−05 | 0.142745E−06 |
| 6 | 1.0000 | 0.445710E−04 | 0.128589E−04 | −0.146871E−05 | 0.140208E−06 |
| 12 | 1.0000 | −0.940814E−03 | −0.258808E−03 | 0.786859E−04 | −0.824435E−05 |
| 13 | 1.0000 | 0.406094E−03 | −0.257950E−03 | 0.786552E−04 | −0.819287E−05 |
| 15 | 1.0000 | −0.310108E−05 | 0.821332E−04 | −0.241434E−04 | 0.350987E−05 |
| 16 | 1.0000 | 0.653024E−03 | 0.136385E−03 | −0.432446E−04 | 0.581260E−05 |
| 17 | 1.0000 | 0.389439E−03 | 0.316680E−03 | −0.109023E−03 | 0.169552E−04 |
| 18 | 1.0000 | 0.141938E−02 | 0.448397E−03 | −0.151077E−03 | 0.227742E−04 |

Table 1 shows that the zoom lenses according to the above-described embodiments satisfy the above-described conditions.

TABLE 1

| Condition | 1$^{st}$ Embodiment | 2$^{nd}$ Embodiment | 3$^{rd}$ Embodiment | 4$^{th}$ Embodiment |
|---|---|---|---|---|
| \|fLG1/fw\| | 2.325 | 2.208 | 2.063 | 2.213 |
| Ept/Yimg | −4.493 | −3.719 | −3.550 | −3.051 |
| \|f2/fw\| | 0.817 | 0.941 | 1.026 | 0.905 |
| \|fLm/fLp\| | 1.479 | 1.064 | 1.236 | 0.519 |
| \|fLm/fw\| | 2.052 | 1.569 | 1.543 | 1.083 |
| vdGp | 81.56 | 81.56 | 71.68 | 81.56 |
| NdGp | 1.4971 | 1.4971 | 1.5533 | 1.4971 |

As described above, according to the above-described zoom lenses, in employing a bending-type optical structure, by reducing the effective diameter of an optical element arranged at the IMG side of the optical path change member, the miniaturization may be facilitated and a superior optical performance may be provided. The zoom lenses according to the above embodiments may be employed in a variety of photographing apparatuses with photographing devices for converting an optical image formed by the zoom lens into an electric signal.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

What is claimed is:

1. A zoom lens comprising, in order from an object side to an image plane side:
    a first lens group fixed to the image plane during zooming, having a positive refractive power, and including a single lens having a negative refractive power, an optical path change member for changing an optical path, and a positive lens group having a positive refractive power, which are arranged in order from the object side;
    a second lens group having a negative refractive power and including a negative lens group and a positive lens group which are arranged in order from the object side with an air gap;
    a third lens group fixed to the image plane during zooming and having a positive refractive power; and
    at least one lens group having a positive refractive power,
    wherein a lens group arranged closest to the image plane comprises a positive lens group and a negative lens group which are arranged in order from the object side with an air gap, and the zoom lens satisfies the following conditions:

$1.4<|fLG1/fw|<5.8$ and $-4.8<Ept/Yimg<-2.5$, wherein "fLG1" is a focal length of a lens arranged closer to the object side than the optical path change member in the first lens group, "fw" is the focal length of the overall zoom lens at a wide angle position, "Ept" is the position of an exit pupil at a telephoto position, and "Yimg" is the maximum image height on the image plane.

2. The zoom lens of claim 1, wherein the focal length f2 of the second lens group satisfies a condition that $0.6<|f2/fw|<1.60$.

3. The zoom lens of claim 1, wherein the third lens group comprises a lens in which at least one surface is aspherical.

4. The zoom lens of claim 3, wherein the aspherical surface has a shape in which a positive refractive power decreases closer to a paraxial.

5. The zoom lens of claim 1, wherein a positive lens group included in the lens group arranged closest to the image plane comprises a lens in which at least one surface is aspherical.

6. The zoom lens of claim 5, satisfying a condition that $0.3<|fLm/fLp|<1.53$, wherein "fLm" is the focal length of a negative lens group included in the lens group arranged closest to the image plane side, and "fLp" is the focal length of a positive lens group included in the lens group arranged closest to the image plane side.

7. The zoom lens of claim 1, satisfying a condition that $0.8<|fLm/fw|<2.15$, wherein "fLm" is the focal length of a negative lens group included in the lens group arranged closest to the image plane side.

8. A zoom lens comprising, in order from an object side to an image plane side:
    a first lens group fixed to the image plane during zooming, having a positive refractive power, and including a negative lens group having a negative refractive power, an optical path change member for changing an optical path, and a positive lens group having a positive refractive power, which are arranged in order from the object side;
    a second lens group having a negative refractive power and including a negative lens group having a negative refractive power and a positive lens group having a positive refractive power which are arranged in order from the object side with an air gap;
    a third lens group fixed to the image plane during zooming and having a positive refractive power; and
    at least one lens group having a positive refractive power,
    wherein a lens group arranged closest to the image plane comprises a positive lens group having a positive refractive power and at least one aspherical surface, and a negative lens group having a negative refractive power, which are arranged in order from the object side with an air gap, and the zoom lens satisfies the following conditions:

$1.4<|fLG1/fw|<5.8$;

$-4.8<Ept/Yimg<-2.5$; and $0.3<|fLm/fLp|<1.53$, wherein "fLG1" is the total focal length of a lens group arranged closer to the object side than the optical path change member in the first lens group, "fw" is the focal length of the overall zoom lens at a wide angle position, "Ept" is the position of an exit pupil at a telephoto position, "Yimg" is the maximum image height on the image plane, "fLm" is the focal length of a negative lens group included in the lens group arranged closest to the image plane side, and "fLp" is the focal length of a positive lens group included in the lens group arranged closest to the image plane side.

9. The zoom lens of claim 8, wherein the focal length f2 of the second lens group satisfies a condition that $0.6<|f2/fw|<1.60$.

10. The zoom lens of claim 8, satisfying a condition that $0.8<|fLm/fw|<2.15$.

11. A zoom lens comprising, in order from an object side to an image plane side:
    a first lens group fixed to the image plane during zooming, having a positive refractive power, and including a negative lens group having a negative refractive power, an optical path change member for changing an optical path, and a positive lens group having a positive refractive power, which are arranged in order from the object side;
    a second lens group having a negative refractive power and including a negative lens group having a negative refractive power and a positive lens group having a positive refractive power which are arranged in order from the object side with an air gap;
    a third lens group fixed to the image plane during zooming and having a positive refractive power; and
    at least one lens group having a positive refractive power,
    wherein a lens group arranged closest to the image plane comprises a positive lens group having a positive refractive power and a negative lens group having a negative refractive power which are arranged in order from the object side with an air gap, and the zoom lens satisfies the following conditions:

$1.4 < |fLG1/fw| < 5.8;$ $vdGp > 63.0;$ and $NdGp < 1.63,$ wherein "fLG1" is the total focal length of a lens group arranged closer to the object side than the optical path change member in the first lens group, "fw" is the focal length of the overall zoom lens at a wide angle position, and "vdGp" and "NdGp" are respectively the Abbe number at a d-line and the refractive index at a d-line of a positive lens included in a positive lens group of the lens group arranged closest to the image plane side.

12. The zoom lens of claim 11, satisfying a condition that $-4.8 < Ept/Yimg < -2.5,$
wherein "Ept" is the position of an exit pupil at a telephoto position, and "Yimg" is the maximum image height on the image plane.

13. The zoom lens of claim 11, wherein the focal length f2 of the second lens group satisfies a condition that $0.6 < |f2/fw| < 1.60.$ 14. The zoom lens of claim 12, satisfying a condition that $0.3 < |fLm/fLp| < 1.53,$
wherein "fLm" is the focal length of a negative lens group included in the lens group arranged closest to the image plane side, and "fLp" is the focal length of a positive lens group included in the lens group arranged closest to the image plane side.

15. The zoom lens of claim 14, satisfying a condition that $0.8 < |fLm/fw| < 2.15.$ 16. A photographing apparatus comprising:
the zoom lens of claim 1; and
a photographing device for converting an optical image formed by the zoom lens into an electric signal.

* * * * *